Sept. 17, 1929. K. F. GALLIMORE ET AL 1,728,406
CHUCK
Filed April 20, 1927
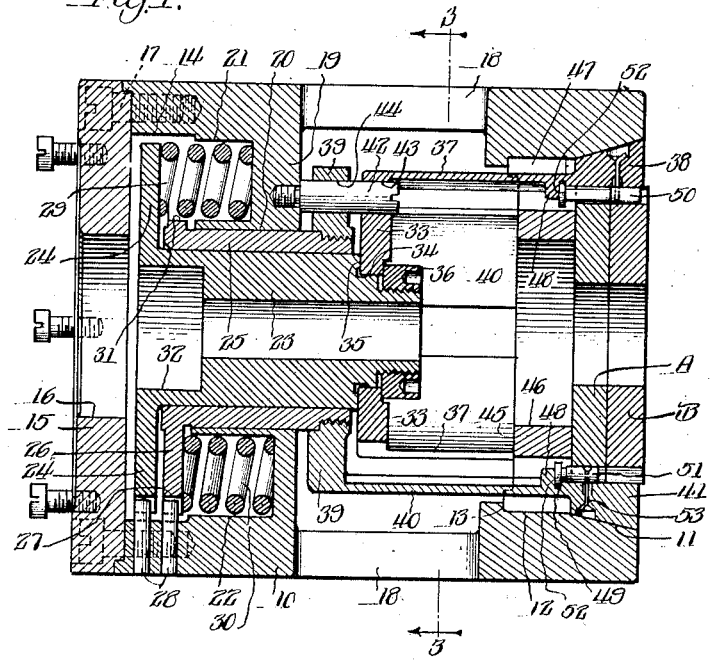
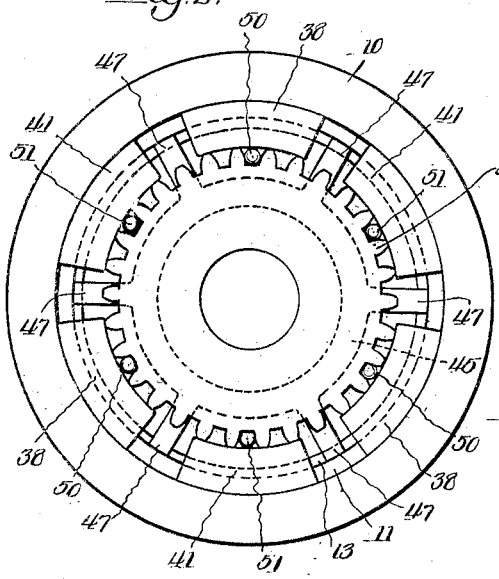
Inventors
Keith F. Gallimore,
Raymond M. Woytych,
By Lindall Parker Carson
Attys.

Patented Sept. 17, 1929

1,728,406

UNITED STATES PATENT OFFICE

KEITH F. GALLIMORE AND RAYMOND M. WOYTYCH, OF FOND DU LAC, WISCONSIN, ASSIGNORS, BY MESNE ASSIGNMENTS, TO THE HEALD MACHINE COMPANY, OF WORCESTER, MASSACHUSETTS, A CORPORATION OF MASSACHUSETTS

CHUCK

Application filed April 20, 1927. Serial No. 185,114.

The invention relates generally to devices for holding objects during metal removing operations, and is more particularly relevant to chucks for precision work which are adapted for use with internal grinding machines.

Where quantity production of a piece of work is exceedingly advantageous, as for example in the case of production of certain narrow faced gears, the efficiency of the operating machine and the operator in charge thereof will be enhanced if the number of chuckings is reduced.

One of the objects of the invention is to provide a new and improved work chuck for quantity production arranged to receive a plurality of work blanks for one metal removing operation, which work blanks may be accurately and quickly inserted and centered with respect to the axis of the chuck, and which may be as rapidly removed after the completion of the working operation.

Another object is to provide a chuck of this type for precision work which is compact, sturdy and simple in construction, and which may be readily disassembled for cleaning, oiling or replacement of the parts.

Other objects and advantages will become apparent as the description proceeds, and from the accompanying drawings, in which:

Figure 1 is a longitudinal section of a chuck embodying the preferred form of our invention.

Fig. 2 is a front view of the chuck showing a work blank clamped in position.

Fig. 3 is a sectional view taken on the line 3—3 of Fig. 1.

In attaining the objects of this invention, the preferred form of the chuck embodies a collet type chuck adapted to receive a plurality of work blanks, such as a pair of narrow faced gears; means incorporated in said chuck to first aline, center and grip the work blank farthest in said chuck, and means to successively aline, center and grip the remaining blank or blanks, the blank farthest in the chuck being alined by an element of the chuck, and the remaining blank or blanks being alined by the one first alined or by the next adjacent blank.

Referring to the drawings, 10 represents the body of the chuck which is, in the present instance, a hollow cylinder in form. A taper bore 11 is provided at the front end of the body which bore terminates in a counter bore 12 ending in turn at an upwardly projecting shoulder 13. The rear end of the body is also counter bored as at 14 to form a rear chamber which is adapted to be closed by means of an enclosing plate 15 having a central axial opening 16 therein, said plate being secured to the body 10 in any suitable manner, as by means of the screws 17. The chuck body is adapted to be rigidly secured to a flange on the work spindle (not shown) of a grinding machine, in any suitable manner. A plurality of clearance passages 18 formed in the side walls of the body 10 serve as a means to conduct away any matter thrown off during the operation of the machine.

Between the rear and central chambers of the chuck is a wall 19 which, however, provides a central axial bore 20 connecting said chambers. The wall 19 has therein a plurality of rearwardly opening pockets 21 and 22 spaced equally about the bore 20. In the present instance there are six of these pockets arranged in two sets of alternating pockets 21 and 22, the pockets 22 being deeper than the pockets 21, the purpose of which will become hereinafter apparent.

The means by which the work blanks are engaged and held in the chuck comprises generally a pair of resiliently held sliding members each carrying a series of jaws of which those carried by one member specifically engage one work blank and those carried by the other member engage the second work blank. This means comprises, in this instance, an outer plunger 25 in the form of a sleeve slidably mounted in the axial bore 20 and an inner plunger 23 slidably mounted within the sleeve 25. The inner and the outer plungers 23 and 25 provide integrally formed radial flanges 24 and 26 respectively, which extend into the chamber formed by the rear counterbore 14 and overlie the radial series of pockets 21, 22. The flanges 24 and 26 provide slots, 27 in their peripheries, and a pair of pins 28 rigid with the body 10 fit in said slots to prevent angular movement of the plungers 23 and 25 in the bore 20, yet allowing longitudinal movement.

Resilient means, such as the helical coiled springs 29, 30 are positioned in the pockets 21, 22 and bear against the flanges 24 and 26 to exert a rearward force thereon. As before mentioned the pockets of one set are deeper than those of the other set to permit springs of the same size and strength to be used. Thus the springs 30, mounted in the deeper pockets 22, engage the flange 26 on the outer plunger 25 while the springs 29 in the shallower pockets 24 extend through appropriately formed apertures 31 in the flange 26 and bear against the flange 24 on the inner plunger 23. A recess 32 for the reception of a chuck operating member (not shown) is provided centrally of the flanged end of the outer plunger 23.

The work-blank engaging jaws in this embodiment are carried by collets carried, one in front of the other, by the forward ends of the inner and outer plungers for limited reciprocation thereby. The front collet as shown in Fig. 3, comprises a flat portion 33 (which may be substantially triangular in shape as shown) having a central aperture 34 adapted to fit over the end of the inner plunger 23 and abut a shoulder 35 provided thereon. A nut 36 having a screw threaded engagement with the end of the plunger 23 is provided to secure the front collet in place. A plurality of collet arms 37 extend forwardly from the portion 33, these arms being desirably spaced at equal angular distances and formed integrally with the portion 33. Each arm carries a jaw 38 at the forward end thereof.

The rear collet comprises a substantially circular contrally apertured disk 39 adapted to be secured upon the forward end of the outer plunger 25 as by means of a screw threaded engagement therewith. A plurality of collet arms 40 extend forwardly from equally spaced points on the periphery of the disk 39 and each carries at its forward end a jaw 41 which is substantially the same as the jaws 38 carried by the forward collet.

Suitable means for preventing rotational displacement of the two collets comprises herein a pin 42 rigid with the body 10 and extending through suitable registering openings 43 and 44 formed in the said collets 33, 39. The collets are thus held against rotation but free sliding movement thereof is permitted.

As may be seen from the drawings each collet, in this instance, carries three collet arms and jaws each spaced angularly at equal distances. When the collets are assembled with their respective plungers, the disposition of the parts is such that the arms and jaws of one collet alternate with the arms and jaws of the other collet, with the arms of the rear collet extending forwardly through the space provided between the triangular sides of the collet portion 33.

As has been already mentioned, the front end of the body is provided with a taper bore 11 and a counterbore 12 which terminates in a shoulder 13. The counterbore 12 is adapted to receive a suitable means adapted to determine and aline the position of that work blank which is farthest in the chunk, such means herein comprising a ring 45 having a central aperture 46 concentric with the axis of the chuck and having a plurality of radially extending portions 47. The latter engage the sides of the counterbore 12 and abut the shoulder 13. In the present instance six radial portions are provided which separate six regularly spaced openings through which the forwardly projecting collet arms 37 and 40 extend.

The blank engaging jaws 38, 41 provided by the two collets are substantially similar to each other in general construction and comprise an enlarged slightly arcuate head, having an arcuate inner face parallel to the axis of the chuck and a tapered arcuate outer face which is complementary to and adapted to engage the tapered bore 11 on the chuck body. Since the collet arms 37, 40 which carry the jaws are resiliently flexible it may be seen that the tapered surfaces on the heads will be held firmly against the tapered bore surface, and upon longitudinal movement of the collets the arcuate inner faces of the heads will be moved toward or from the axis of the chuck.

As seen in Fig. 1 each jaw head is provided with an inwardly extending abutment or shoulder 48 near the inner end thereof. A transverse groove 49 is also provided in each face adjacent the shoulder 48. Cylindrical pins 50 and 51 having enlarged flat heads 52 at one end adapted to fit snugly in the groove 49 and to abut the shoulder 48, are provided to center the work in the chuck from the pitch line of the gears to be held. The pins 50, 51, are secured to the jaw heads in any preferred manner such as that shown here in which a wire 53 or the like extends through registering apertures in the pins and the heads respectively and is bent or upset to hold the pins firmly upon the inner face of the heads.

As may be seen in the drawings the length of the pins varies, those pins 51 which are secured upon the heads 41 carried by the rear collet being short in order that they may engage only the work blank farthest in the chuck, while those pins 50 mounted upon the other heads 38 which are carried by the front collet, are substantially longer, and are of small diameter where they will pass between the teeth of the gear blank farthest in the chuck, in order that they may contact only the outer or forward gear blank. The work contacting surface of each pin is preferably slightly shorter than the thickness of the work-blanks to be held in the chuck.

To mount the work or gear blanks A, B in the chuck the plungers 23, 25 are moved forwardly in the chuck against the force of the springs 29, 30 by a rod or similar device (not shown). This movement is translated to the front and rear collets and they in turn move forward, sliding each jaw head 38 and 41 carried thereby over the taper bore 11 on the forward end of the chuck body 10. This moves the jaw heads radially from the axis of the chuck and enlarges the diameter of the front opening. The pair of gear blanks A, B, may now be inserted in the chuck the inner gear A being pushed past the work contacting surface of the pins 50 on the heads 38 into registry with the pins 51 on the heads 41. In this position the inner gear abuts the ring 45 and, when the chuck rotates, its axis of rotation will consequently be perpendicular to the plane of its rear surface. As the gear teeth are, or may be, originally made square with this surface, the ultimate ground bore of the gear will be parallel to elements of the gear teeth, which condition is what is sought for in all spur gears. Even if the operator fails to push the gear blank A hard against the ring 45, the chuck will do it for him, for the pins 51, when the aforesaid rod is released, move rearwardly as well as inwardly.

The work blank or gear A, by such releasing of the operating rod, is fully clamped in the exact position desired before the pins 50 or the jaws 38 exert pressure on the gear blank B. This is so because, as will be apparent from Fig. 1 of the drawings, the outer plunger 25 is somewhat shorter than the surface of the inner plunger upon which it is slidably mounted. When the forward collet is moved to the right the flange 24 of the inner plunger is moved to engage the flange 26 of the rear collet, said collet being held against movement by the springs 30 until such contact is made. This provides what may be termed a lost motion connection therebetween in which the inner plunger and consequently its collet will move first for a limited distance before the outer plunger and its collet are moved and consequently, the jaws 41 and pins 51 carried by the rear collet will engage the gear blank A before the jaws 38 and pins 50 engage the gear blank B. The further and subsequent movement of the jaws 38 and pins 50, caused by the pressure of the springs 29 (the movement being possible because of the lost motion connection) draws the gear blank B into the chuck and causes its rear surface to be firmly pressed against the front surface of the blank A, thus squaring the front blank by the rear blank. This positive squaring and clamping action takes place because the jaws in each case (and the pins also) are drawn into the chuck as they come together.

It will be apparent from the foregoing description that a chuck has been provided which is capable of receiving and holding a plurality of gear or work-blanks for operation thereon and further that each gear will be correctly and accurately located in the chuck. Thus, the total number of chuckings will be cut in half for any piece of work, resulting in substantially increased production and lower cost. It will be obvious that instead of providing duplicate clamping mechanisms to clamp two work blanks in position, such mechanism could be provided in triplicate or more, in order to clamp three or more work blanks in alinement for a given operation.

While we have shown in the drawings, and described in detail the preferred embodiment of our invention it is to be understood that we do not thereby intend to limit the same to the construction disclosed, but aim in the appended claims to cover all the modifications and alternative constructions falling within the spirit and scope of the invention.

We claim as our invention:

1. A chuck having, in combination, a body, a pair of plungers mounted therein for axial reciprocation, and a plurality of work-blank engaging means carried by each of said plungers and arranged to engage a pair of work-blanks upon movement by said plungers, the engaging means carried by one of said plungers being adapted to hold one work-blank and the engaging means carried by the second plunger being adapted to hold the other work blank.

2. In a chuck adapted to hold a pair of work-blanks, the combination of a hollow body having an open end, a plurality of blank engaging means positioned radially within said open end, said means comprising two sets of alternating members each of which is adapted to engage one of said blanks, and a single operating means therefore operable to move first one and then the other of said sets into or out of engagement with said blanks.

3. A chuck adapted to hold a pair of work-blanks, comprising, in combination, a body, a plurality of blank engaging members radially arranged in two sets of alternating members within said body, means carrying said elements, said means comprising a pair of collets, one for each set of members, mounted within the body for axial movement relative thereto, and actuating means for reciprocating said collets.

4. A chuck adapted to hold a pair of work-blanks comprising, in combination, a body, a plurality of blank engaging members radially arranged in two sets of alternating members within said body, means carrying each set of elements, said means comprising a pair of collets, one for each set, mounted within the body for axial movement relative thereto, and actuating means for reciprocating said collets, said actuating means being effective to move one of said collets prior to the other whereby said work-blanks will be engaged or released successively.

5. A chuck adapted to hold a pair of blanks comprising, in combination, a body, a pair of members mounted in said body for axial movement relative thereto and provided with a lost motion connection therebetween so that actuation of one member will cause the movement of the other member after a definite interval, and blank engaging jaw means carried by each member and actuated thereby to successively engage or release a plurality of work-blanks.

6. A chuck adapted to hold a pair of work-blanks comprising, in combination, a hollow body having an axial bore therein, a sleeve slidable in said bore, a plunger slidable in said sleeve and adapted to engage said sleeve to move said sleeve in one direction, resilient means acting on said sleeve and plunger to resist said movement, a collet secured to said sleeve, a second collet carried by said plunger, a plurality of arms extending forwardly from each of said collets, a jaw head carried by each arm, said heads being arranged radially within the forward end of said chuck to engage the work-blanks, the heads movable by said sleeve being arranged to engage one work-blank and the heads movable by said plunger being adapted to engage the second work blank, and means rigid within said body arranged to square up one of said work-blanks in said chuck.

7. A chuck adapted to hold a pair of work-blanks comprising, in combination, a body, a first plunger slidable axially in said body, a second plunger slidable in said first plunger, so that movement of one of said plungers is adapted to effect a movement of the other, and two sets of jaw heads radially positioned within the forward end of said body, each of said sets being carried by one of said sliding plungers for axial reciprocation thereby.

8. A chuck adapted to hold a pair of work-blanks comprising, in combination, a body, a first plunger slidable axially in said body, a second plunger slidable in said first plunger, and two sets of jaw heads radially positioned within the forward end of said body, each of said sets being carried by one of said sliding plungers for axial reciprocation thereby, said plungers having a lost motion connection therebetween whereby movement of one plunger will cause a delayed movement of the second plunger to provide a successive engagement of said work-blanks by said sets of collet heads.

9. In a chuck adapted to hold a plurality of work blanks, the combination with a hollow body having an open end, a plurality of sets of jaws to engage work blanks, each set of jaws having work engaging means located in different positions axially of said chuck, and members separately connected to each set of jaws whereby movement of a given member will move all of a given set of jaws, of means for moving said members rearwardly of said chuck in succession, and an alining member in said chuck to position the work blank farthest in said chuck, whereby the first work blank is positively squared by said alining member, and as the next set of jaws comes into operation the next work blank is alined by the one preceding it.

In testimony whereof we have hereunto affixed our signatures.

KEITH F. GALLIMORE.
RAYMOND M. WOYTYCH.